US006430301B1

(12) United States Patent
Petrovic (10) Patent No.: US 6,430,301 B1
(45) Date of Patent: Aug. 6, 2002

(54) FORMATION AND ANALYSIS OF SIGNALS WITH COMMON AND TRANSACTION WATERMARKS

(75) Inventor: Rade Petrovic, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 09/651,729

(22) Filed: Aug. 30, 2000

(51) Int. Cl.[7] .................................................. H04K 1/00
(52) U.S. Cl. ........................................ 382/100; 713/176
(58) Field of Search ................................ 382/100, 232; 380/210, 252, 287, 54; 713/176; 370/527, 529; 704/200.1, 273; 381/73.1; 705/57, 58; 348/460, 463

(56) References Cited

U.S. PATENT DOCUMENTS 5,699,427 A * 12/1997 Chow et al. ..................... 380/3
5,862,260 A * 1/1999 Rhoads ......................... 382/232

FOREIGN PATENT DOCUMENTS

| CA | 2276638 A1 | * | 1/2000 | ............. G06F/3/00 |
| EP | 0 581 317 A2 | * | 2/1994 | ............. G07D/7/00 |
| WO | WO 99/39344 A1 | | 8/1999 | ............. G11B/20/00 |
| WO | WO 99/62022 A1 | | 12/1999 | ............. G06K/9/36 |

OTHER PUBLICATIONS

Zhao, J., "A WWW Service to Embed and Prove Digital Copyright Watermarks," *Proc. European Conf. on Multimedia Applications, Services and Techniques (ECMAST'96)*, May 1996, pp. 695–710.*
Hartung, F. et al., "Watermarking of MPEG–2 encoded video without decoding and re–encoding," *Proc. SPIE vol. 3020: Multimedia Computing and Networking 97*, Feb. 1997, pp. 264–274.*
Hartung, F. et al., "Digital Watermarking of MPEG–2 Coded Video in the Bitstream Domain," *Proc. IEEE Int. Conf. on Acoustics, Speech and Signal Processing*, Apr. 1997, pp. 2621–2624.*
Hartung, F. et al., "Watermarking of uncompressed and compressed video," *Signal Processing*, vol. 66, May 1998, pp. 283–301.*
Zhao, J., "Applying Digital Watermarking Techniques to Online Multimedia Commerce," *Proc. Int. Conf. on Imaging Science, Systems, and Applications (CISSA'97)*, Jun./Jul. 1997, 7 pages.*
Muranoi, R. et al., "Video Retrieval Method using ShotID for Copyright Protection Systems," *Proc. SPIE vol. 3527: Multimedia Storage and Archiving Systems III*, Nov. 1998, pp 245–252.*

(List continued on next page.)

*Primary Examiner*—Andrew W. Johns
(74) *Attorney, Agent, or Firm*—Barry R. Lipsitz (57) ABSTRACT

A system for embedding and detecting digital watermarks, e.g., for copyright protection of digital content distributed via the Internet or other channels. Different copies of content, such as audio data, are formed with a common watermark (CW), and different transaction watermarks (TW). Based on a user transaction request, portions of the different copies of the content are assembled to provide a copy with a unique sequence of TWs associated with the user. A copy of content which is subsequently located can be analyzed to determine if it has been used in a collusion attack, where a pirate attempts to modify the watermarks, e.g., in an averaging or cut-and-splice attack. The CWs are provided in time-aligned intervals of the different copies of the content so they are not modified by the attack. Content from different web sites can be analyzed by first determining if a particular CW is embedded in the content, and, if so, recovering the TW to identify the unauthorized distributor.

47 Claims, 4 Drawing Sheets

OTHER PUBLICATIONS

*Digimarc® Watermarking Guide*, ©1999 Digimarc Corporation, 22 pages.*

Dittmann, J. et al., "Combining digital Watermarks and collusion secure Fingerprints for digital Images," *Proc. SPIE vol. 3657: Security and Watermarking of Multimedia Contents*, Jan. 1999, pp. 171–182.*

Kalker, T., "System Issues in Digital Image and Video Watermarking for Copy Protection," *Proc. IEEE Int. Conf. on Multimedia Computing and Systems*, Jun. 1999, pp. 562–567.*

Adelsbach, A. et al., "Proving Ownership of Digital Content," *Proc. 3$^{rd}$ Int. Workshop on Information Hiding, LNCS vol. 1768*, Sep./Oct. 1999, pp. 117–133.*

Guth, H.–J. et al., "Error– and Collusion–Secure Fingerprinting for Digital Data," *Proc. 3$^{rd}$ Int. Workshop on Information Hiding, LNCS vol. 1768*, Sep./Oct. 1999, pp. 134–145.*

Lin, P.–L., "Robust transparent image watermarking system with spatial mechanisms," *The Journal of Systems and Software*, vol. 50, Feb. 2000, pp. 107–116.*

Dittmann, J., "Combinting digital Watermarks and collusion secure Fingerprints for customer copy monitoring," *Proc. IEE Seminar on Secure Images and Image Authentication*, Apr. 2000, pp. 6/1–6/6.*

* cited by examiner

FORMATION AND ANALYSIS OF SIGNALS WITH COMMON AND TRANSACTION WATERMARKS

BACKGROUND OF THE INVENTION

The present invention relates to a system for embedding and detecting digital watermarks.

Digital watermarks have been proposed and used for copyright protection of signals such as audio, video, and images. The primary objective is to hide an auxiliary signal within a host signal in such a way that it is substantially imperceptible and difficult to remove without damaging the host signal. The auxiliary signal may carry some information that is helpful, e.g., in a copyright protection mechanism. For example, it can communicate "no copy allowed" to a compliant copying device, and/or it can carry a signature code that identifies the rightful owner, author, and/or content. The signature code can be used to monitor usage of copyrighted material, resolve ownership disputes, keep track of royalties, etc.

Further, digital watermarks can be used to distinguish different copies of the same host signal distributed to different users in legitimate transactions. The primary objective is, if a copy is pirated and redistributed illegally, to trace down the user who obtained it in the legitimate transaction and, presumably, to prosecute him for breach of copyright laws. The secondary objective is to deter casual copying, e.g., among small groups of people.

For example, a pirate can order music over the Internet from a legitimate distributor, directly or using a proxy. Then, the pirate can resell it or redistribute it for free using the Internet or other means. A similar scenario can occur in the distribution of video or other images (e.g., still photos, computer graphics and games, etc.) over the Internet, or in the distribution of video or music over "pay-per-view" channels in a cable or satellite TV network.

Moreover, in the Internet distribution business, the host signal (music, image or video) is typically stored and delivered in a compressed form (e.g., MP3 format in music). This means that a typical watermark embedding process requires decompression, embedding, and then recompression before transmission. Obviously, this imposes additional processing requirements, and adds more noise to the host signal in the process.

Furthermore, many watermark embedding processes are subject to collusion attacks. A major distinction between Transaction Code Embedding (TCE), also sometimes referred to as "fingerprinting", and embedding of other messages, such as content ID, owner ID, copy control codes, etc., is that, with TCE, a pirate can design special kind of attacks based on the fact that TCE embeds different auxiliary signals into the same content.

For example, by simply subtracting two copies with different watermarks, the pirate obtains the difference of the pure watermarks, which can help him analyze the hiding technique and devise a sophisticated attack. Secondly, the pirate can average a number of copies to weaken individual watermarks, make them interfere, and eventually make them undetectable. Similarly, the pirate can cut portions of different copies and splice them together. The resulting signal has segments of different watermarks spliced together, which is hard to use to identify the pirate.

One existing technique to fight collusion attacks, described in International Publication no. WO 99/39344, published Aug. 5, 1999 to J. M. Winograd et al., is based on a random phase-modulation technique that precedes the watermark embedding stage. The random phase modulation, although imperceptible to a user, makes copies of the same original sufficiently different so that the collusion attack cannot work. For example, averaging multiple copies of a piece of music produces phase cancellations that make the resulting signal annoying to the listener.

However, this technique does not address the issue of the processing (computational) load of TCE. To the contrary, it proposes an additional processing stage that can only increase the processing load.

Another technique, described in International Publication no. WO 99/62022, published Dec. 2, 1999, to D. Wong and C. Lee, greatly reduces the real-time processing required for TCE by preprocessing a host signal to provide two uncompressed copies, one containing segments with an embedded binary "0", while the other contains corresponding segments with embedded binary "1". Successive segments are selected from one of the two copies to provide a time-multiplexed composite host signal with an embedded binary data that corresponds to the transaction code.

However, this technique does not address the security issue and collusion attacks. Moreover, splicing of the segments may result in perceptible artifacts. Additionally, this technique does not address the issue of combining two copies that are saved in a compressed form.

Accordingly, it would be desirable to provide a watermark embedding and detection system that addresses the above and other concerns.

The system should not require decompression and recompression. It is also desirable that the same technique can be applied to different compression/decompression algorithms (such as MPEG, AAC, AC3, ATRAC, etc. in music).

Furthermore, the system should not be overly computationally intensive and costly since embedding is performed frequently (into every copy, not into every original). Although some complex algorithms can make sense for embedding a high quality, high security watermark in a production studio, it may well be too costly to run it on the fly in the Internet distribution of copyrighted content. The embedding and detection system should not be too costly for such applications.

Moreover, the system should thwart collusion attacks, and should enable identification of an illegitimate distributor of protected content, or, more precisely, the original recipient of the content. Additionally, the system should be easily implementable in Internet distribution and other distribution modes.

Also, the system should avoid perceptible artifacts.

The present invention provides a transaction code embedding and detection system that provides the above and other advantages.

SUMMARY OF THE INVENTION

The present invention relates to a system for embedding and detecting digital watermarks.

Each copy of content to be protected is labeled with a unique code referred to as a "transaction code". Using the transaction code, it is possible to identify the user that obtained a legitimate copy of the content but distributed it illegally, and prosecute him, or at least blacklist him to prevent his further purchases. Thus, legal action can be taken against the user even when the distributor to the user is immune from legal action, e.g., due to being a foreign-based company.

In one aspect of the invention, a method for embedding watermarks in a host signal, includes the step of forming watermarked copies of the host signal with at least one different transaction watermark and at least one common watermark embedded therein. The host signal may be a music piece (e.g., song) that is to be protected. Thus, a given copy contains transaction watermarks with the same symbol values. Portions of the different watermarked copies are assembled (e.g., using multiplexing) according to a transaction code to form an output signal with transaction watermarks that correspond to the transaction code.

The output signal is then distributed to a user, who can be subsequently identified if the content is re-distributed in an unauthorized manner.

In a further aspect of the invention, a method is presented for analyzing a watermarked signal e.g., which is suspected to have been re-distributed illicitly and modified using a collusion attack. In possible collusion attacks, different copies are cut-and-spliced together or averaged. The method includes the step of recovering a plurality of transaction watermarks of the watermarked signal that define respective symbols thereof. At least one hypothesis transaction code is provided that defines respective symbols thereof. The symbols of the watermarked signal are compared to corresponding symbols of the hypothesis transaction code to determine a correspondence therebetween. Based on the correspondence, a probability is determined that the hypothesis transaction code matches a transaction code that is associated with at least some of the respective symbols of the transaction watermarks.

For example, for binary codes, it may be determined that m bits of the transaction watermarks match out of a total of n bits of the hypothesis transaction code. The invention provides a surprisingly high degree of certainty that the hypothesis transaction code matches (or doesn't match) the transaction code of the transaction watermarks even when there is only a partial match of the symbols (e.g., bits).

A number of possible hypothesis transaction codes can be compared to the symbols of the watermarked signal until a likely match is found. Or, if certain transaction codes are suspected (e.g., based on their association with suspected persons), those codes can be compared first to prevent unnecessary computations.

The transaction code symbols can be binary or other M-ary symbols.

In another aspect of the invention, a method is provided for analyzing content (such as a music piece) that is distributed via a plurality of distribution points (such as web sites) in a network (such as the Internet). The distribution points may be suspected for unauthorized re-distributions of the content, or a check can be made periodically of relevant web sites as a matter of policy by the copyright holder of the content, or its agent. The content is obtained from the distribution points, e.g., using a web crawler. For each of the distribution points, it is determined whether the content thereof includes a common watermark that corresponds to a predetermined common watermark code. The content may contain no common watermark, or it may contain a common watermark that does not corresponds to the predetermined common watermark code.

However, for the content that includes the common watermark at issue, a transaction watermark is retrieved from the content, and a transaction code associated with the transaction watermark is identified.

In this case, the identified transaction code can be compared with at least one hypothesis transaction code to determine a correspondence therebetween, and a probability can be determined that the identified transaction code matches the hypothesis transaction code.

The presence of the common code in the content tells us that the associated distributor is an unauthorized distributor (assuming the authorized distributor has not just visited its own web site). The transaction code tells us how the content got to the unauthorized site (i.e., by associating the transaction code with an original purchaser or user of the content who subsequently redistributed it, and is presumably without authorization).

Of course, it is possible that the original purchaser was authorized in distributing the content to a second person, and the second person redistributed the content illegally. But, in any case, the start of the chain of distribution can be tracked down.

Corresponding apparatuses are also presented.

DETAILED DESCRIPTION OF THE INVENTION

The invention relates to a system for embedding and detecting digital watermarks.

To overcome the problems of existing watermarking techniques, we propose several innovative concepts for transaction code embedding and detection.

The following terms are used:

MSI—Matching Signal Interval;

CW—Common Watermark;

TC—Transaction Code;

TW—Transaction Watermark; and

TWI—Transaction Watermark Interval

Figure 1:
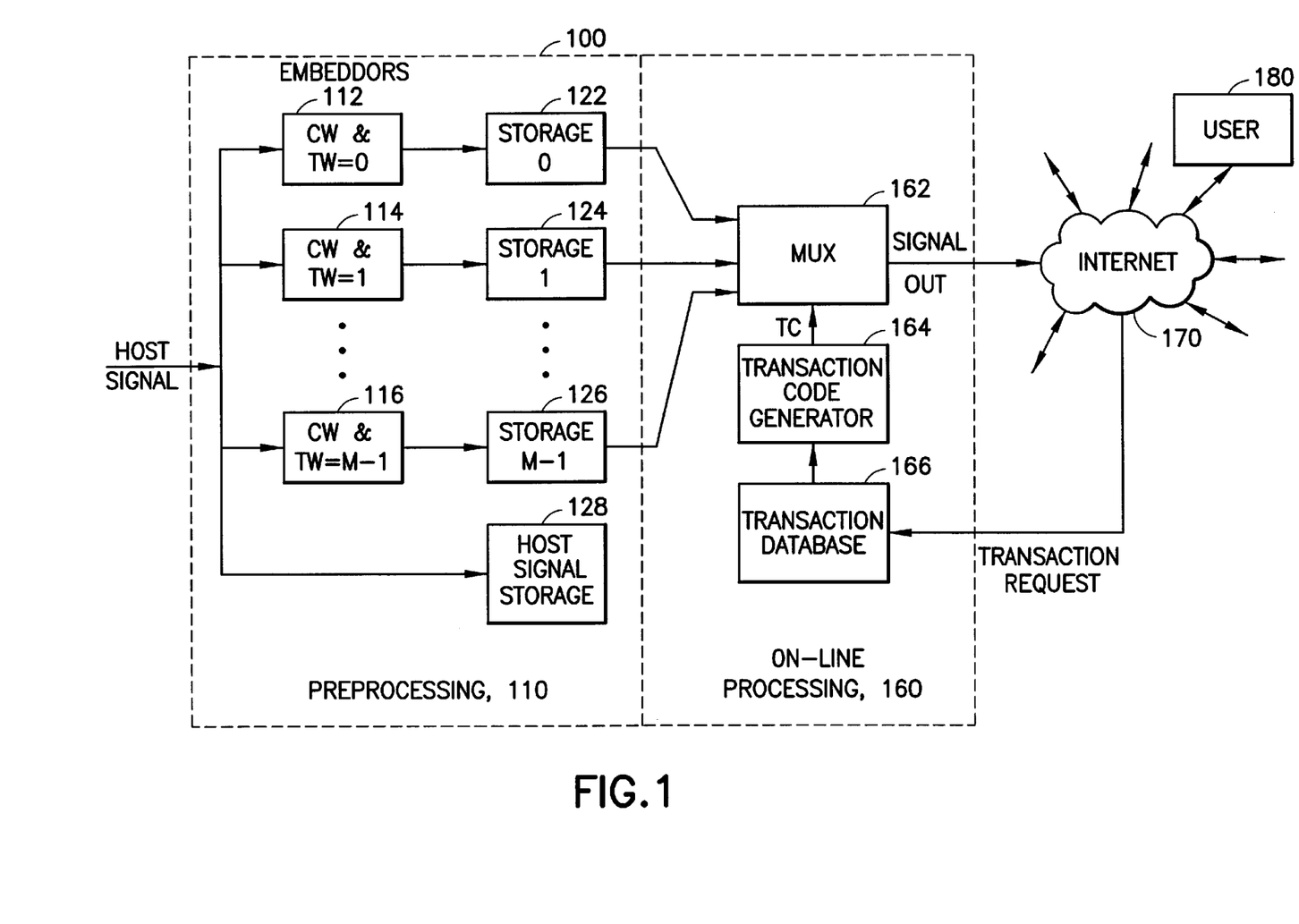
FIG. 1 illustrates a system for distributing watermarked content over a network in accordance with the present invention.

FIG. 1 illustrates a system for distributing watermarked content over a network such as the Internet, in accordance with the present invention. The system 100 includes a preprocessing stage 110 and an "on-line" processing stage 160. In the preprocessing stage 110, a host signal is stored at a host signal storage device 128 in such a way to be easily accessible for the purpose of "forensic analysis", discussed below (see FIG. 3). Typically, the storage is a hard disk, and the signal is stored in a compressed form, e.g., according to the MPEG, JPEG or other standard. However, the present invention is suitable for use with other types of storage as well, such as analog tapes, uncompressed data stored on compact discs (CDs), digital video discs (DVDs), etc.

The preprocessing stage 110 provides embedding of M distinct TWs (M≧2) into copies of the host signal at embeddors 112, 114, . . . , 116. The obtained signals are stored at respective storage devices 122, 124, . . . , 126, which again can be a hard disk, random access memory (RAM), CD, DVD, tape, etc, and may include compression. The storage devices 122, 124, ..., 126 need not be separate elements but may be shared portions of a common storage device.

Each watermark contains two distinct portions. One is common for all copies of the content, and is termed a "Common Watermark" (CW). The other portion is distinct for each copy, and is termed a "Transaction Watermark" (TW). The TW carries a digital message that can be represented by a string of symbols. Each symbol is selected from a set of M possible symbols, which are labeled, e.g., as {0, 1, ..., M−1}. The embeddors 112, 114, ..., 116 embed a different TW into their respective copy of the host signal (one watermark per embeddor) in such a way that the TWs in the first copy of the host signal have all symbols equal to "0", the TWs in the second copy of the host signal have all symbols equal to "1", and so forth, and for M>2, up through the TWs in the (M−1)st copy of the host signal, which have all symbols equal to "M−1".

The minimum preprocessing and storage is required for M=2, i.e., for binary signaling, where only two different TWs are embedded and stored: one TW with all symbols equal to "0", and the other TW with all symbols equal to "1".

In the on-line processing stage 160, the system responds to a transaction request obtained from an example user 180 over the Internet 170 or other network for downloading a piece of content. It should be apparent that the transactions can be requested and executed fully or in part using telephone lines, CATV, Digital Satellite Distribution, or other distribution systems, in a similar manner.

The user downloading the content should be notified of the copyright restrictions, and asked to accept them. To deter violations, the user may also be notified of the existence of copyright violation tracing features that are enabled by the invention. Also, the user should supply some kind of identifying information so the user can be identified in the event of a subsequent copyright violation. In principle, this information can be generated automatically, e.g., as the e-mail address to which the content is sent, or the physical address of the destination for the pay-per-view delivery on the CATV network, or an account number, credit card number, telephone number or the like. This identifying information is stored in a Transaction Database (TD) 166.

For each transaction of a particular content, a unique Transaction Code (TC) is generated at a Transaction Code Generator 164. This code is related to the entry in the TD 166 for the particular transaction in such a way that it can be easily regenerated. Also, when a detector, described below, (see FIG. 3) identifies a TC, it should be possible to find the corresponding entry in the TD 166. For example, each transaction may be added to the TD 166 in the order of the arrivals of the user requests. The index into the TD 166 can be used as a seed for a predefined random number generator, and the output can be used as a TC.

The TC is generated as a series of M-ary symbols, which are used to control a multiplexer 162 to select dynamically from the M pre-processed copies of the watermarked content, e.g., in the storage devices 122, 124, ..., 126. The selection is made on a segment-by-segment basis, where each segment is associated with one symbol of the TC. For example, when the TC symbol is "0", the corresponding segment is taken from the watermark storage "0" (122). The selected segments are concatenated or otherwise assembled to make a continuous stream of a watermarked signal that is output from the multiplexer 162 and delivered to the user 180, e.g., via the Internet 170. This output comprises the content that the user desires, such as a music, with watermarks embedded imperceptibly therein that identify the user and, optionally, the distributor and/or content.

Figure 2:
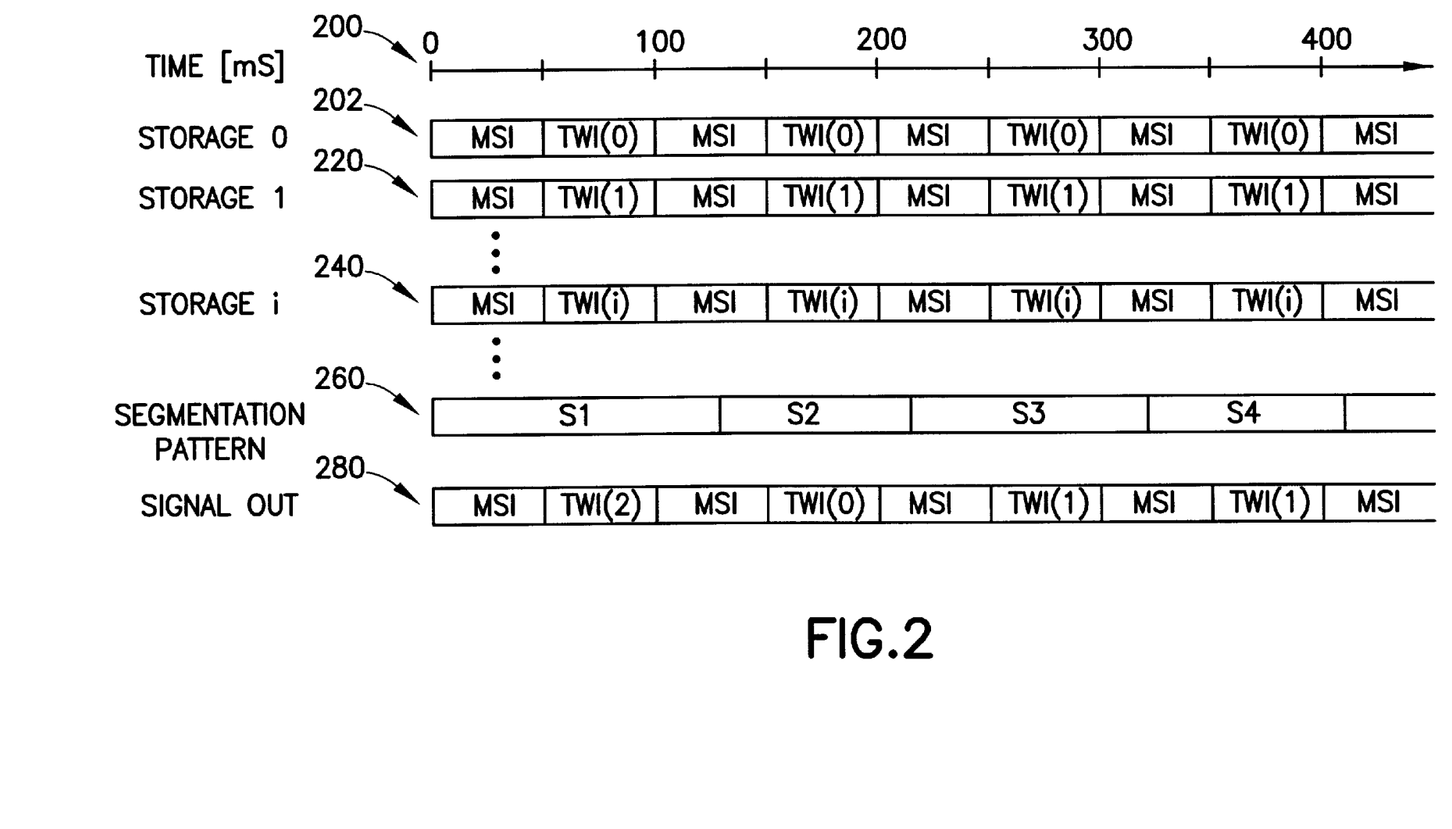
FIG. 2 illustrates a multiplexing procedure for forming an outgoing signal containing a desired transaction code, in accordance with the present invention.

FIG. 2 illustrates a multiplexing procedure for forming an outgoing signal containing a desired transaction code, in accordance with the present invention.

Each storage device 122, 124, ..., 126 of FIG. 1 contains a watermarked signal having distinct Transaction Watermark Intervals (TWI(0), TWI(1), ..., TWI(i), ...) interleaved with Matching Signal Intervals (MSIs), which contain matching (substantially indistinguishable) signals in all copies. For example, for the different signals 202, 220, ..., 240, the MSIs in the time interval from 0 to 50 ms match one another, the MSIs in the time interval from 100 to 150 ms match one another, and so forth.

For example, referring to the time line 200, each watermarked signal comprises a MSI between 0 and 50 ms, 100 to 150 ms, 200 to 250 ms, 300 to 350 ms, and so forth. Moreover, each watermarked signal comprises a TWI between 50 and 100 ms, 150 to 200 ms, 250 to 300 ms, 350 to 400 ms, and so forth.

The MSIs that separate symbols of the TWs are advantageous. Note that embedding of CWs into MSIs is preferred, but optional, while the existence of MSIs is important for compressed domain "on-line" processing, and artifact-free transitioning between copies.

Moreover, the value of the embedded symbols in the respective TWIs is the same for a given watermarked signal (e.g., signal 202, 220, 240 or 260). For example, the signal from storage device 0, as shown at time line 202 has values TWI(0), the signal from storage device 1, as shown at time line 220 has values TWI(1), the signal from storage device i, as shown at time line 240 has values TWI(i), and so forth.

The time line 200 is shown as an example only. Other MSI and TWI durations may be used. Moreover, the MSIs and TWIs need not have the same duration.

In principle, CWs can be embedded as an independent watermarking layer anywhere in the content. However, in the case of overlap of Common and Transaction Watermarks, the host signal distortion accumulates from each of them, and the chance of perceptual artifacts increases. Further, CWs and TWs may interfere with each other. Therefore, the CWs are preferably embedded in the MSI signal portion only.

A segmentation pattern (S1, S2, S3,) 260 determines time intervals during which a portion of one of the signals is retrieved from its corresponding storage device and concatenated to make a continuous stream of an outgoing signal. For example, assume the desired transaction code is: 2, 0, 1, 1, ... Then, the segments are taken from storage devices, 2, 0, 1, 1, ... respectively. Note that we are assuming for simplicity that the storage device number is the same as the embedded symbol number, but this is not required. Moreover, binary or higher M-ary signaling may be used.

The segmentation pattern 260 shows that each segment straddles only one TWI, and the transition between segments does not occur within a TWI. This is important since switching between unequal signals (unequal due to different watermarks) could cause discontinuities that might be perceptible. However, switching from one watermarked signal storage to another during a MSI causes no discontinuities and no perceptible artifacts, so this is allowable. Note that CWs are preferably inserted in substantially the same way and the same place (e.g., time-aligned) in each copy of the stored signal, so that the signal copies are substantially indistinguishable at any instant in corresponding MSIs. Advantageously, with this arrangement, no perceptible artifact occurs in a transition. Also, when one subtracts two copies, the host signal and CW cancel so that CW is not subject to differential analysis. Also, the CW is not subject to collusion attacks such as averaging or cut-and-splice, since the CW does not get changed at all. Specifically, the average of the same waveform is the waveform itself, and the cut-and-splice technique only replaces a CW segment with the same segment.

Moreover, any collusion attack that involves making difference (subtraction) between two copies results typically in a zero signal in the place where the CW is inserted, so it is not subject to differential analysis.

Thus, the fact that the CW is substantially the same in all copies (substantially the same waveform and the same position with respect to the host signal) protects the CWs from collusion attacks, and enables them to be embedded in the MSIs, thereby providing efficient and successful transaction code detection. Moreover, the MSIs provide transparent and flexible embedding, including compressed domain embedding.

Note that the segments S1, S2, S3, . . . , are not necessarily equal in length. This is useful for accommodate multiplexing of signals stored in a compressed form. In particular, a typical data compression algorithm splits signals into frames, windows or blocks, and then compresses each of them independently. Those blocks may vary in size from algorithm to algorithm, and even using the same algorithm. To avoid the need for decompression, multiplexing and recompression, the multiplexing should be done by taking one or more blocks from one storage and then switching to the blocks from another storage at block boundaries.

To enable the switching during any MSI, the MSI should be sized long enough to contain at least one block boundary. For example, it has been found that, for various compression algorithms for music, such as MPEG, AAC, AC3, and ATRAC, and for bit rates above 64 kbps, none of the algorithms produces block lengths larger than 64 ns. Therefore, we can chose a MSI length equal to 64 ms and be confident that each interval contains at least one block boundary.

Figure 3:
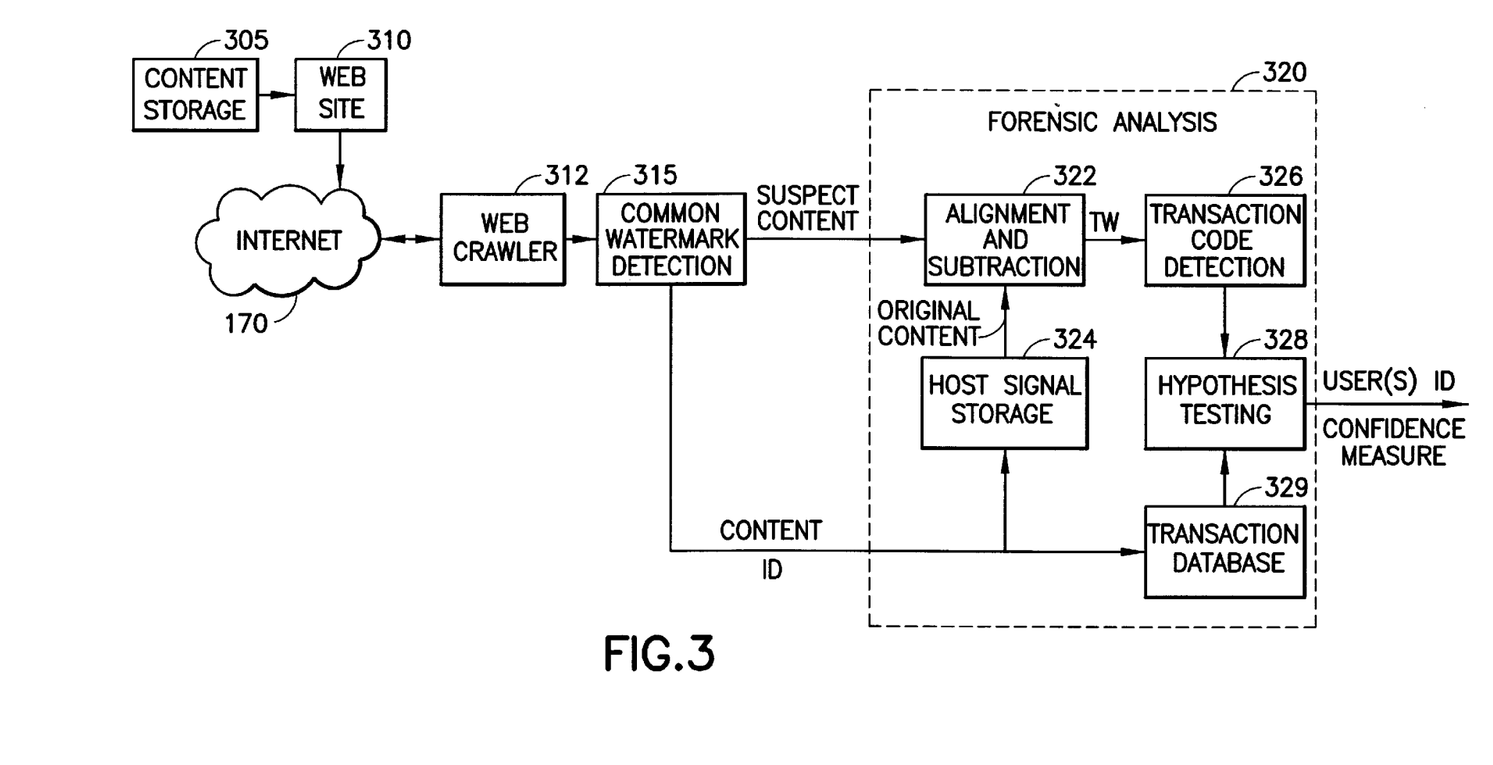
FIG. 3 illustrates a system for detecting and analyzing watermarked content in accordance with the present invention.

FIG. 3 illustrates a system for detecting and analyzing watermarked content in accordance with the present invention. While a copyright protection implemented on the Internet is illustrated, similar copyright protection methods, with violator identification, can be used for any distribution channel.

The search process can be divided into two steps: common watermark detection 315 and forensic analysis 320. The primary role of the common watermark detection block 315 is to identify the content that should contain the transaction codes.

For example, a legitimate music distributor may want to check if legitimately-purchased music has been redistributed for free over the Internet. In this case, the legitimate distributor, or his/her representative, may design software that searches Internet sites containing free music, and download short segments of music pieces and pass them to the common watermark detector 315. Such software, that is used to search the Internet for a specific content, is sometimes called a "web crawler", as shown by a web crawler block 312. Similarly, the commercial sites (that sell music) may offer "preview clips" that can be downloaded free of charge and checked for the CW.

Note that the TC identifies the recipient of the watermarked signal., who may not be the same as the distributor whose site the web crawler is visiting. Then, it can be implied that the original recipient is a distributor too, by allowing his copy to be put into the chain of distribution.

Each distributor may have a unique hiding pattern, also known as a steganographic (stego) key, for the CW. Accordingly, any detection of a watermark with a given stego key indicates that the content has been distributed through this distributor. Alternatively, a number of distributors may share the same stego key, but use distinct data patterns to distinguish among themselves. The former embodiment is more secure, since the secret information is not shared with other distributors, while the latter embodiment is more efficient, since one search action can benefit many distributors.

Moreover, the hiding places, described by the stego key, are preferably not the same for the CWs and TWs. In this case, if any information is extracted by analyzing TWs, it cannot be used to attack the CWs.

Note that the CW is embedded and detected as a whole, so we need one set of parameters to describe the whole CW, which is called a key. However, the TW is both embedded and analyzed on a symbol-by-symbol basis, so the parameters describing each symbol are treated as separate units, or keys.

An example of a suspect web site 310 includes a content storage device 305 with a predefined type of files (e.g., MP3 files in the case of music). One should distinguish between the legitimate distributors, which protect copyrights using the system 100, and suspect sites, which are typically home pages that contain illegitimate music. Of course, even a big licensed distributor may be caught in an illegitimate business, but this is not expected to be the primary pirating path.

Thus, different stego keys are used for the different TW symbols, e.g., TW(0) through TW(M−1), and the CWs.

In the above example, where a web crawler visits different web sites in the search for content with CWs, the search has to be simple and efficient to make rational use of resources. But, when the suspect content is found, it can be downloaded in its complete form and put through a much more powerful analysis in the forensic analysis stage 320.

Thus, in one option, a relatively short duration of the content is obtained from the distribution points (e.g., web sites) and analyzed to see if the content has a CW that is associated with a particular CW code. The duration may be at least twice the duration of the CW. If the CW is detected for this relatively short duration of the content, a longer duration of the same content is retrieved from the associated distribution point and the TW therein is retrieved. Alternatively, if sufficient processing resources are available, or if a distribution point is suspected a priori, only one download of the content need be made to analyze the CW, and then the TW, if appropriate.

The power of the forensic analysis comes from the possibility of so-called differential analysis. With differential analysis, the original content is aligned with the suspect (test) content, and then subtracted to obtain the watermark itself. This is performed at an alignment and subtraction block 322, which receives the suspect signal as the watermarked content from the common watermark detector 315, and the original signal from a host signal storage device 324.

Since the host signal typically acts as noise in the watermark detection procedure, it is much more reliable and informative when the analysis is done on the pure watermark instead of the watermark embedded in the host.

For the aligning of the original content with the suspect content, to do the subtraction at the function 322, it is advantageous to automatically identify what the original content is. We can use the CW for this purpose, i.e., the CW can carry the content identification data (besides the source, or distributor identification). The content ID can be used to automatically retrieve the appropriate host signal from among many host signals in the storage device 324. The number of host signals can be very high, depending on how many different pieces of content are being protected.

Next, the suspect signal as received may be modified in various ways that prevent simple alignments, e.g., as a part of an attack, or due to standard processing. For example, an image can be cropped, rotated or stretched, or a music file can be sped-up or slowed-down. In these cases, the analysis of the CW, with its known position within the host file and its known size and shape, can be used to detect various processing, and then to correct it. For example, if a speed-up is detected, we can slow-down the suspect content to make the alignment with the original possible. For this purpose, it is advantageous for the CW to be present throughout the content, preferably in the MSIs interleaved with the TWIs, as illustrated in FIG. 2.

However, to allow efficient searches over the Internet, the presence of a CW should be detectable even from small pieces (passages) of content. For example, an individual CW may fit in a five-second clip, but the same CW should be repeated throughout the piece of content. In this manner, any ten-second clip would contain at least one whole CW.

Another powerful feature of the forensic analysis 320 is that it allows extensive hypothesis testing at a Hypothesis Testing block 328. This additional processing is practical mostly because forensic analysis occurs much less frequently than CW detection attempts. As shown in FIG. 3, after a transaction code detection block 326 detects a Transaction Code from the TW, this code is compared to all the Transaction Codes associated with the particular piece of content to find possible matches. The list of embedded transaction codes are retrieved from a transaction database 329, or regenerated based on the data in the transaction database 329, in response to the content ID.

This hypothesis testing is particularly important if a collusion attack has occurred. If properly designed, the forensic analysis detects all transaction codes involved in the collusion, with high probability, even if a large number of copies are used in the attack.

Consider a collusion attack where pieces of different copies of content are spliced together to form a new copy, in an attempt to obscure the transaction code (TC) defined by the TWs. Indeed, only scrambled pieces (portions) of each individual TC can be extracted from the composite copy. However, if the TC is long enough, even scrambled pieces are sufficient to identify the transactions reliably.

For example, consider a three minute (180 sec) long music piece. Assume that the MSIs are 64 ms long, and TWIs are 36 ms long (see FIG. 2). This means that a pair of consecutive TWI and MSI segments is 0.1 seconds long, and there are 1800 such pairs in the whole music piece. Furthermore, assume that the transaction code symbols are binary, i.e., M=2 in FIG. 1. This means that the transaction code can carry n=1800 bits of data in the whole music piece (one bit per TWI).

Now, assume that a pirate has acquired k=10 different copies of the music piece, each having a different transaction code. The pirate may attempt to cut each copy into short pieces, say one second long, then assemble a new copy using consecutive segments from randomly selected copies. In this manner, the overall TC becomes a scrambled version of the TCs in participating copies. The pirate may hope that the scrambling process obscures the identities of the users participating in the collusion attacks.

Indeed, only one tenth of the recovered TC segments will exactly match any TC segment that is inserted in a copy used in collusion, i.e., 180 bits will match. However, the remaining 1620 bits have a 50% chance of matching. Therefore, when we compare an inserted TC with the received TC, we may find a match on 990 bit positions out of 1800 possible matches. Now, let us consider what will happen if we compare a random TC, not actually used in the collusion, with the received TC. Mathematical expectation tells us that we can expect, on average, 50% (i.e., 900) bit matches. Mathematics tells us also that it is possible to receive 990 or more bit matches between this code and the received T code with the probability:

$$P(i \geq 990) = 2^{-1800} \sum_{i=990}^{1800} \binom{1800}{i} = 0.000012$$

Figure 4:
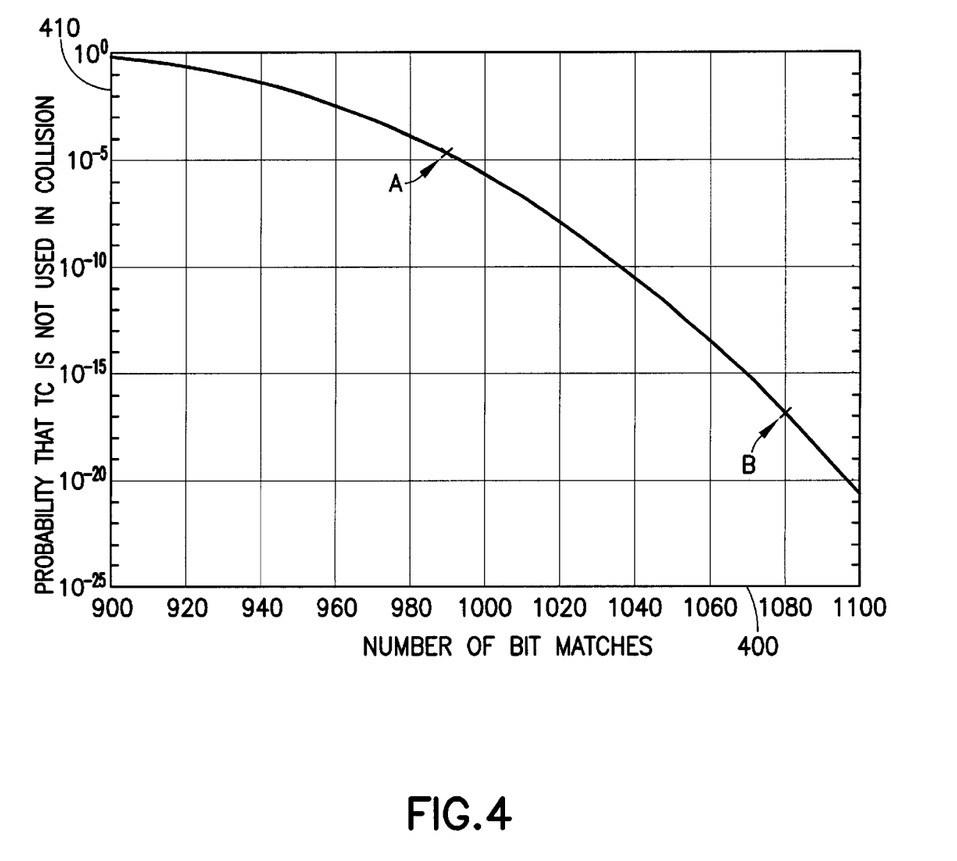
FIG. 4 illustrates how a probability that a transaction code (TC) is not used in a collusion attack decreases when a number of bit matches between a retrieved TC and a TC under test increases, in accordance with the present invention.

In other words, if a TC under test matches the received TC at 990 bit positions, there is a chance of one in 83,000 that the tested code was not actually used in the collusion attack (see point "A" in FIG. 4). It can therefore be concluded with a high degree of certainty that the tested code was used in the collusion attack.

More generally, the probability that a TC was not part of a collusion attack, if match is found on m bits of the detected n-bit long TC is expressed by formula:

$$P(m, n) = 2^{-n} \sum_{i=m}^{n} \binom{n}{i}$$

The above formula may be difficult to calculate for large n and m. In this case it is useful to apply Stirling's formula to obtain the approximation:

$$P(m, n) = \frac{1}{\sqrt{2\pi}} \sum_{i=m}^{n} \sqrt{\frac{n}{i(n-1)}} \left(\frac{n}{i} - 1\right)^{i} \left(\frac{n}{2(n-i)}\right)^{n}$$

A confidence measure, based on the above analysis, and user(s) IDs are output from the hypothesis testing block 328. The probability for non-binary cases, which impose additional storage requirements, can be determined similarly.

FIG. 4 illustrates how a probability that a transaction (T) code is not used in a collusion attack decreases when number of bit matches between a retrieved TC and a TC under test increases, in accordance with the present invention.

A horizontal axis 400 indicates a number of bit matches, and a vertical axis indicates the probability. The curve 420 shows the relationship. The probability that a TC is used in the collusion is one minus the probability that the TC is not used in the collusion.

The probability that a TC is part of a collusion attack can be used as a measure of confidence in our analysis. The confidence increases significantly when the number of matched bits increases, but can be increased also by combining results of different tests. For example, if TCs associated with a particular user are found in several music pieces, then we can implicate this user with much more confidence than if his TC is found in only one test. Typically, a particular user is associated with different TCs for different transactions. However, if we have a suspect user, we search the transaction database for his name, and for each content he purchased, we can find (regenerate) the corresponding TC.

Thus, by performing the above hypothesis testing for all TCs in the Transaction Database 329, we can find the codes that are most likely used in the collusion, and the confidence measure for each of the implications. This is a brute force approach that may test millions of hypotheses, yet should only take a few seconds or minutes with modern computers. The number of hypotheses can be reduced greatly if particular individuals are known as suspected pirates, in which case their transaction codes can be traced and used as hypotheses.

Now consider a collusion attack where an attacker averages a number of different copies of content. Assume also that the TCs are binary (M=2), and that the "0" bit in a TC is hidden differently (e.g., using a different stego key) than bit "1". For example, different PN sequences can be used for spread spectrum watermarks, or different delays for autocorrelation modulation watermarks. The use of spread spectrum watermarks is described, e.g., in U.S. Pat. Nos. 5,687,191 and 5,822,360, both of which are incorporated herein by reference. The use of autocorrelation modulation watermarks is described, e.g., in U.S. Pat. No. 5,940,135, incorporated herein by reference. However, essentially any watermarking technique may be used.

Thus, if two copies containing distinct TC symbols (bits) in a given TWI are averaged, both symbols (bits) exist in the resulting copy, albeit in a weakened form. However, in the differential analysis, both of them are clearly detectable. Further still, if $i_0$ copies with bit "0" at m-th position are averaged together with $i_i$ copies with "1" at i-th position, the differential analysis will produce an estimate of $a_i = i_1/(i_0 + i_1)$, i.e., an estimate of the fraction of copies in the i-th bit position that are "1".

Now, we test the hypothesis that a TC has been included in the collusion attack by adding up coefficients $a_i$ for all bits where the TC under test has "1", and adding up coefficients $1 - a_i$ for all bits where the code under test has "0". Mathematically, this can be expressed as calculating the sum, m, according to the formula:

$$m = \sum_{i=1}^{n} (2a_i b_i - a_i - b_i + 1)$$

where n is the length of {$a_i$56 string, and $b_i \in 0,1$} is the bit value at i-th bit position of the TC under test.

If our hypothesis is false, then the mathematical expectation of the sum m is n/2. However, if the TC under test is included in the collusion process, the mathematical expectation of the sum m is n(k+1)/2k, where k is the number of copies used in the collusion attack ($k \geq 1$). For any obtained sum m, we can calculate the probability P(m,n) that the tested code is not used in the collusion attack, using the above formulas, and base our further action on this result. Note that for a low number of copies used in collusion attack, we will obtain a high value for m, and we can identify colluded TCs with virtual certainty. For example, for k=5, and n=1800, we expect to obtain m=1080, and the probability that the TC under test is not part of the collusion attack is approximately $10^{-17}$, as can be seen from FIG. 4 (point "B"). Conversely, the probability that the TC under test is part of the collusion attack is virtually 100%.

In summary, a general procedure for tracking down a copyright violator is to search for a common watermark in the pool of the contents that are potentially violating copyrights (e.g., sites containing MP3 music). Then, the content with detected common watermark is retrieved, and identified. Possible alignment distortions are measured and corrected. Next, the original signal is aligned and subtracted to obtain a pure watermark, which is analyzed to obtain the set of estimates {$a_i$} defined above. If no averaging attack has occurred, most of those values will be 0 or 1. However, if a "cut and splice" attack makes the cut inside the bit interval i, we can expect fractions of both values to be detected, and $1 > a_i > 0$.

Further, for each TC used in the transaction watermarking of the content under analysis, we calculate the sum m according to the formula above. Then, we select a few TCs that scored the highest values of m (or values of m above a threshold value for m) and calculate probabilities that this m can be obtained by a code that was not actually used in the collusion attack. These probabilities, together with the transaction information related to the implicated TCs are reported for further action.

Note that, in the invention disclosed herein, all the TC symbols can be used in the procedure of collusion attack analysis. No overhead for synchronization, framing, error correction and detection etc. is necessary because of the presence of the CWs and the forensic analysis. This is another significant improvement over the prior art used for transaction encoding.

Accordingly, it can be seen that the present invention provides a system for embedding and detecting digital watermarks. In a pre-processing phase, different versions of content, such as audio data, that is to be protected are formed by inserting a different transaction watermark (TW), and a common watermark (CW), into the different versions. Then, in an on-line processing phase, based on a transaction request from a user, portions of the different versions of the content are assembled to provide a version with a unique sequence of transaction watermarks (TW) that can be associated with the user.

A version of content which is subsequently located, e.g., using a web crawler to search web sites, can be analyzed to determine if it has been used in a collusion attack, where a pirate attempts to modify the watermarks, e.g., in a averaging or cut-and-splice attack. In particular, the content from different web sites can be analyzed by first determining if a particular CW is embedded in the content, and, if so, recovering the TW to identify the unauthorized distributor.

Moreover, the invention has uses other than copyright protection, including marketing, tracking of user preferences, verification of sales, measuring and monitoring of network traffic, and so forth.

Although the invention has been described in connection with various preferred embodiments, it should be appreciated that various modifications and adaptations may be made thereto without departing from the scope of the invention as set forth in the claims.

What is claimed is:

1. A method for embedding watermarks in a host signal, comprising the steps of:
   forming watermarked copies of the host signal with at least one different transaction watermark and at least one common watermark embedded therein; and
   assembling portions of the different watermarked copies according to a transaction code such that an output signal with transaction watermarks that correspond to the transaction code is formed and such that the at least one common watermark can be subsequently used to recover the at least one transaction watermark.

2. The method of claim 1, wherein:
   the common watermark identifies a distributor of the host signal.

3. The method of claim 1, wherein:

the transaction code identifies a user that receives the output signal.

4. The method of claim 1, wherein:

the transaction code is generated in response to a user request to access the host signal.

5. The method of claim 1, comprising the further step of:

storing the watermarked copies for subsequent use in said assembling step.

6. The method of claim 1, wherein:

the different transaction watermarks in the watermarked copies define respective different symbols.

7. The method of claim 1, wherein:

the transaction watermarks are provided according to different associated steganographic keys.

8. The method of claim 1, wherein:

in the watermarked copies, the common watermarks are time-aligned with one another in respective matching signal intervals.

9. The method of claim 1, wherein:

in the watermarked copies, the transaction watermarks are time-aligned with one another in respective transaction watermark intervals.

10. The method of claim 9, wherein:

in the watermarked copies, the common watermarks are time-aligned with one another in respective matching signal intervals that are interleaved with the respective transaction watermark intervals.

11. The method of claim 9, wherein:

a segmentation pattern associated with the transaction code is used in said assembling step to define time intervals during which portions of the watermarked copies are selected to form the output signal.

12. The method of claim 1, wherein:

the watermarked copies are provided in a compressed form.

13. The method of claim 12, wherein:

said assembling step is responsive to compression frame boundaries of the watermarked copies for forming the output signal.

14. An apparatus for embedding watermarks in a host signal, comprising:

a plurality of embeddors for forming watermarked copies of the host signal with at least one different transaction watermark and at least one common watermark embedded therein; and a multiplexer assembly for assembling portions of the different watermarked copies according to a transaction code to form an output signal with transaction watermarks that correspond to the transaction code such that the at least one common watermark can be subsequently used to recover the at least one transaction watermark.

15. A method for analyzing a watermarked signal with at least one common watermark that identifies a distributor thereof, the method comprising the steps of:

using the common watermark to recover a plurality of transaction watermarks of the watermarked signal that define respective symbols thereof;

providing at least one hypothesis transaction code that defines respective symbols thereof;

comparing the symbols of the transaction watermarks to corresponding symbols of the hypothesis transaction code to determine a correspondence therebetween; and based on said correspondence, determining a probability that the hypothesis transaction code matches a transaction code that is associated with at least some of the transaction watermarks.

16. The method of claim 15, wherein:

the recovering step comprises the step of obtaining a difference between the watermarked signal and an original signal.

17. The method of claim 15, wherein the recovering step further comprises the step of:

using the common watermark to align the watermarked signal with a corresponding original signal.

18. The method of claim 15, wherein:

the probability is based on a number of the symbols used in said comparing step, and a portion of the symbols of the watermarked signal that match the corresponding symbols of the hypothesis transaction code.

19. The method of claim 15, wherein:

the watermarked signal is retrieved from a suspected unauthorized distributor.

20. The method of claim 15, wherein:

the watermarked signal is formed, at least in part, by splicing together a plurality of signal portions that comprise respective transaction watermarks that are associated with respective different transaction codes.

21. The method of claim 20, wherein:

the plurality of signal portions further include respective common watermarks that are interleaved with the transaction watermarks.

22. The method of claim 15, wherein:

the watermarked signal is formed, at least in part, by averaging a plurality of signals that comprise respective transaction watermarks that are associated with respective different transaction codes.

23. The method of claim 22, wherein:

the plurality of signals further include respective common watermarks that are interleaved with the transaction watermarks.

24. The method of claim 15, comprising the further steps of:

providing a plurality of hypothesis transaction codes that define respective symbol thereof;

for each hypothesis transaction code, comparing the symbols of the transaction watermarks to corresponding symbols of the hypothesis transaction code to determine a correspondence therebetween; and for each hypothesis transaction code, determining a probability based on the correspondence thereof that the hypothesis transaction code matches a transaction code that is associated with at least some of the transaction watermarks.

25. The method of claim 24, comprising the further step of:

recovering a content identifier from the watermarked signal for use in selecting the plurality of hypothesis transaction codes from a transaction code database.

26. The method of claim 25, wherein:

the content identifier is determined according to common watermarks that are interleaved with the transaction watermarks in the watermarked signal.

27. An apparatus for analyzing a watermarked signal with at least one common watermark that identifies a distributor thereof, the apparatus comprising:

a detector which uses the common watermark to recover a plurality of transaction watermarks of the watermarked signal that define respective symbols thereof;

storage for providing at least one hypothesis transaction code that defines respective symbols thereof;

a comparator for comparing the symbols of the transaction watermarks to corresponding symbols of the hypothesis transaction code to determine a correspondence therebetween; and an hypothesis testing block for determining, based on said correspondence, a probability that the hypothesis transaction code matches a transaction code that is associated with at least one of the transaction watermarks.

28. A method for analyzing content that is distributed via a plurality of distribution points in a network, comprising the steps of:

obtaining the content from the plurality of distribution points;

retrieving a common watermark from the content;

determining, for each of the distribution points, whether the retrieved common watermark corresponds to a predetermined common watermark code; and for the content that comprises the retrieved common watermark that corresponds to the predetermined common watermark code:

retrieving a transaction watermark from the content, and identifying a transaction code associated with the transaction watermark.

29. The method of claim 28, wherein:

a first duration of the content is obtained from the distribution points for use in said determining step and said retrieving a transaction watermark step.

30. The method of claim 28, wherein:

the distribution points are associated with respective web sites in a computer network.

31. The method of claim 28, wherein:

the transaction code identifies a distributor of the content.

32. The method of claim 28, wherein:

a first duration of the content is obtained from the distribution points for use in said determining step, and a second, longer duration of the content is obtained from the distribution points for use in said retrieving a transaction watermark step.

33. The method of claim 32, wherein:

the first duration is at least twice a duration of the common watermark.

34. The method of claim 28, comprising the further step of:

comparing the identified transaction code with at least one hypothesis transaction code to determine a correspondence therebetween.

35. The method of claim 34, comprising the further step of:

determining, based on the correspondence, a probability that the identified transaction code matches the hypothesis transaction code.

36. An apparatus for analyzing content that is distributed via a plurality of distribution points in a network, comprising:

a crawler for obtaining the content from the plurality of distribution points;

a common watermark detector for retrieving a common watermark from the content and determining, for each of the distribution points, whether the retrieved common watermark corresponds to a predetermined common watermark code; and a forensic analysis block for retrieving a transaction watermark from the content, and identifying a transaction code associated with the transaction watermark, for the content that comprises the retrieved common watermark that corresponds to the predetermined common watermark code.

37. A method for embedding watermarks in a host signal, comprising the steps of:

forming watermarked copies of the host signal with at least one different transaction watermark and at least one common watermark embedded therein; and assembling portions of the different watermarked copies according to a transaction code to form an output signal with transaction watermarks that correspond to the transaction code wherein the common watermarks are time-aligned with one another in respective matching signal intervals.

38. The method of claim 37, wherein:

the transaction watermarks are provided according to different associated steganographic keys.

39. The method of claim 37, wherein:

in the watermarked copies, the common watermarks are time-aligned with one another in respective matching signal intervals that are interleaved with the respective transaction watermark intervals.

40. A method for analyzing a watermarked signal comprising the steps of:

recovering a plurality of transaction watermarks of the watermarked signal that define respective symbols thereof, providing a plurality of hypothesis transaction codes that define respective symbols thereof;

for each hypothesis transaction code, comparing the symbols of the transaction watermarks to corresponding symbols of the hypothesis transaction code to determine a correspondence therebetween;

for each hypothesis transaction code, determining a probability based on the correspondence thereof that the hypothesis transaction code matches a transaction code that is associated with at least some of the transaction watermarks; and recovering a content identifier from the watermarked signal for use in selecting the plurality of hypothesis codes from a transaction code database wherein the content identifier is determined according to common watermark that are interleaved with the transaction watermarks in the watermarked signal.

41. The method of claim 40, wherein:

the watermarked signal is formed, at least in part, by splicing together a plurality of signal portions that comprise respective transaction watermarks, that are associated with respective different transaction codes and that include respective common watermarks which are interleaved with the transaction watermarks.

42. The method of claim 40, wherein:

the watermarked signal is formed, at least in part, by averaging a plurality of signals that comprise respective transaction watermarks that are associated with respective different transaction codes.

43. The method of claim 42, wherein:

the plurality of signals further include respective common watermarks that are interleaved with the transaction watermarks.

44. A method for analyzing content that is distributed via a plurality of distribution points in a network, comprising the steps of:

obtaining a first duration of the content from the plurality of distribution points;

determining, for each of the distribution points, whether the first duration of content comprises a common watermark that corresponds to a predetermined common watermark code; and for the content that comprises the common watermark that corresponds to the predetermined common watermark code:

obtaining a second duration of the content from the plurality of distribution points;

retrieving a transaction watermark from the second duration of the content, and     identifying a transaction code associated with the transaction watermark.

45. The method of claim 44, wherein:

the first and second durations are equal to on another.

46. The method of claim 44, wherein:

the second duration is longer than the first duration.

47. The method of claim 46, wherein:

the first duration is at least twice a duration of the common watermark.

\* \* \* \* \*